United States Patent
Sanders

(10) Patent No.: US 10,808,439 B2
(45) Date of Patent: Oct. 20, 2020

(54) MAGNETIC GOLF CART PANEL CLOSURE DEVICE

(71) Applicant: Dewayne E. Sanders, Ada, OK (US)

(72) Inventor: Dewayne E. Sanders, Ada, OK (US)

( * ) Notice: Subject to any disclaimer, the term of this patent is extended or adjusted under 35 U.S.C. 154(b) by 807 days.

(21) Appl. No.: 15/010,942

(22) Filed: Jan. 29, 2016

(65) Prior Publication Data

US 2016/0153219 A1 Jun. 2, 2016

Related U.S. Application Data

(63) Continuation of application No. 14/180,507, filed on Feb. 14, 2014, now abandoned.

(51) Int. Cl.
*E05C 19/16* (2006.01)
*B60J 5/04* (2006.01)

(52) U.S. Cl.
CPC ............. *E05C 19/16* (2013.01); *B60J 5/0487* (2013.01); *E05C 19/161* (2013.01); *Y10T 292/11* (2015.04)

(58) Field of Classification Search
CPC ........ E05C 19/16; E05C 19/161; B60J 10/38; B60J 5/0487; Y10T 292/11
USPC .......................... 296/79, 83, 77.1; 292/251.5
See application file for complete search history.

(56) References Cited

U.S. PATENT DOCUMENTS

| | | | | |
|---|---|---|---|---|
| 1,349,569 A | * | 8/1920 | Hart | A44B 17/0011 24/676 |
| 1,377,910 A | * | 5/1921 | Munson | B62B 9/142 296/110 |
| 1,449,080 A | * | 3/1923 | Bail | A44B 17/0011 24/695 |
| 1,661,537 A | * | 3/1928 | Knapp | B60J 1/2011 15/222 |
| 2,319,292 A | * | 5/1943 | Boggs | A41D 3/08 135/119 |
| 2,627,097 A | * | 2/1953 | Ellis | A44B 19/16 174/119 C |
| 2,717,036 A | * | 9/1955 | Harris | B60J 1/2011 160/354 |
| 2,932,545 A | * | 4/1960 | Foley | E05C 19/16 206/818 |

(Continued)

FOREIGN PATENT DOCUMENTS

| | | | | |
|---|---|---|---|---|
| CA | 2542966 A1 | * | 10/2006 | ......... B60H 1/00407 |
| CA | 2542966 | | 6/2012 | |

(Continued)

*Primary Examiner* — Kristina R Fulton
*Assistant Examiner* — Faria F Ahmad

(57) ABSTRACT

A magnetic golf cart panel closure device includes a golf cart with a golf cart enclosure thereon that includes a first panel and a second panel. The first and second panels are positioned in a closed position closing a cart entry or in an open position. A plurality of first magnetic couplers is mounted on the first panel. A plurality of second magnetic couplers is mounted on the second panel. The first magnetic couplers are overlapped with the second magnetic couplers such that the first and second magnetic couplers are releasably engaged with each other. The cart has a bottom edge. A plurality of first mating members is attached to the bottom edge and a plurality of second mating members is attached to the first and second panels. The first and second mating members are engaged together to secure the first and second panels to the bottom edge.

9 Claims, 5 Drawing Sheets

(56) References Cited

U.S. PATENT DOCUMENTS

| | | | | |
|---|---|---|---|---|
| 3,111,735 | A | * | 11/1963 | Ellis .................. A44B 19/16 24/400 |
| 3,455,366 | A | * | 7/1969 | Bogumil .............. A47H 21/00 160/368.1 |
| 3,709,553 | A | * | 1/1973 | Churchill ............. B60J 11/00 16/87.4 R |
| 3,763,917 | A | * | 10/1973 | Antinone ............. E06B 9/521 160/354 |
| 3,827,019 | A | * | 7/1974 | Serbu .................. A41F 1/002 135/117 |
| 4,033,013 | A | * | 7/1977 | Peterson ........... A45C 13/1069 24/303 |
| 4,068,885 | A | * | 1/1978 | Berger ................. B60J 11/02 296/211 |
| 4,155,576 | A | * | 5/1979 | Kennon ............... E05C 19/16 16/82 |
| 4,434,524 | A | * | 3/1984 | Gilchrist ............... E05F 1/00 16/250 |
| 4,688,846 | A | * | 8/1987 | Martin, Jr. .......... B66F 9/07545 296/102 |
| 4,773,694 | A | | 9/1988 | Gerber |
| D311,295 | S | | 10/1990 | Roberts |
| 5,323,835 | A | * | 6/1994 | Bachmeier ........... E06B 9/521 160/354 |
| 5,427,169 | A | * | 6/1995 | Saulters ................ E06B 3/80 160/332 |
| 5,429,404 | A | | 7/1995 | King, Sr. |
| D363,265 | S | | 10/1995 | Althoff |
| 6,003,583 | A | * | 12/1999 | Lacoste ................ E06B 9/54 160/122 |
| 6,439,637 | B1 | | 8/2002 | Tyrer |
| 6,902,220 | B2 | | 6/2005 | Moskos et al. |
| 7,331,369 | B2 | * | 2/2008 | Cordova .............. E05C 19/16 160/122 |
| 7,600,794 | B2 | * | 10/2009 | Ramsauer ............. E05C 1/16 292/163 |
| 7,740,300 | B2 | | 6/2010 | Marsh et al. |
| 7,832,788 | B2 | * | 11/2010 | Marsh .................. B60J 5/06 296/139 |
| 8,356,855 | B2 | | 1/2013 | Sams |
| 8,662,298 | B2 | * | 3/2014 | Aldana ................ A45C 11/00 206/320 |
| 8,689,852 | B2 | * | 4/2014 | Roth ................... A47H 23/00 160/327 |
| 8,882,170 | B2 | * | 11/2014 | Brown, Jr. .......... B60J 5/0487 296/79 |
| 2008/0250716 | A1 | * | 10/2008 | Ranaudo .............. E05B 65/08 49/31 |
| 2009/0261093 | A1 | * | 10/2009 | Fullerton ............. B25H 3/021 220/4.28 |
| 2010/0188177 | A1 | * | 7/2010 | Inage ................. B61D 19/005 335/205 |
| 2013/0276286 | A1 | * | 10/2013 | Latuff ................... B60J 11/06 29/428 |
| 2014/0265428 | A1 | * | 9/2014 | Fennell ................. B60J 5/08 296/143 |

FOREIGN PATENT DOCUMENTS

| | | | | |
|---|---|---|---|---|
| WO | WO 2011119715 | A2 | * | 9/2011 ............. B60J 5/08 |
| WO | WO2011119715 | A4 | | 8/2012 |

\* cited by examiner

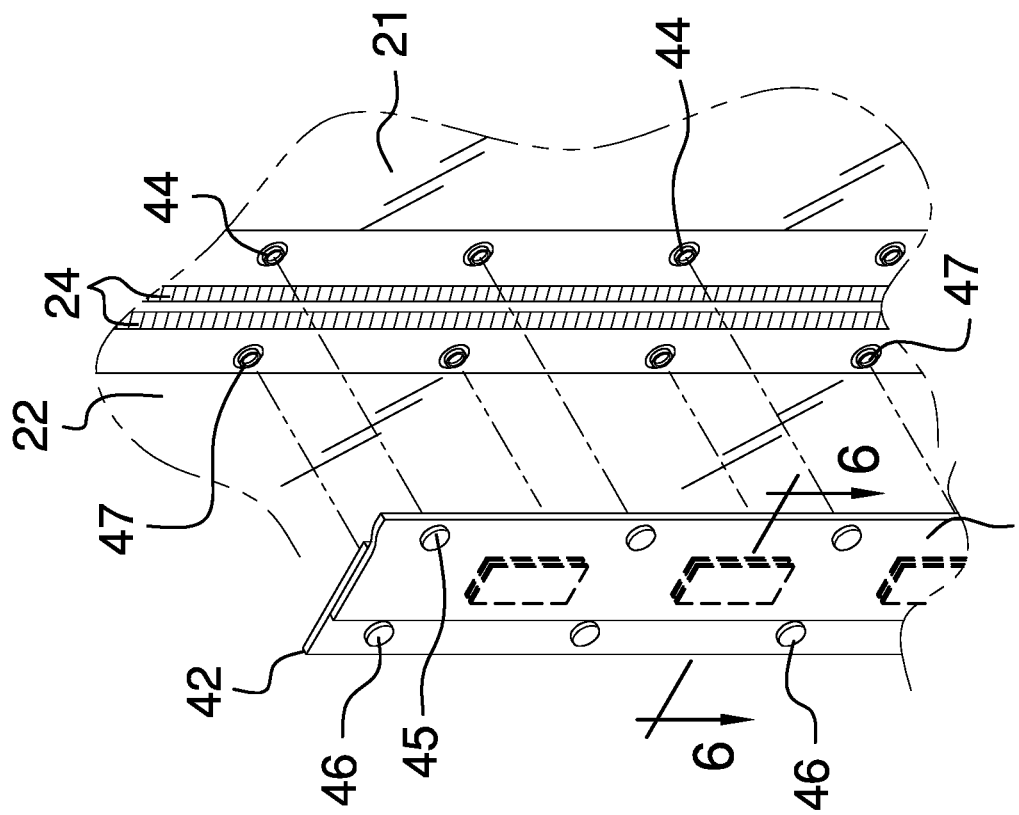
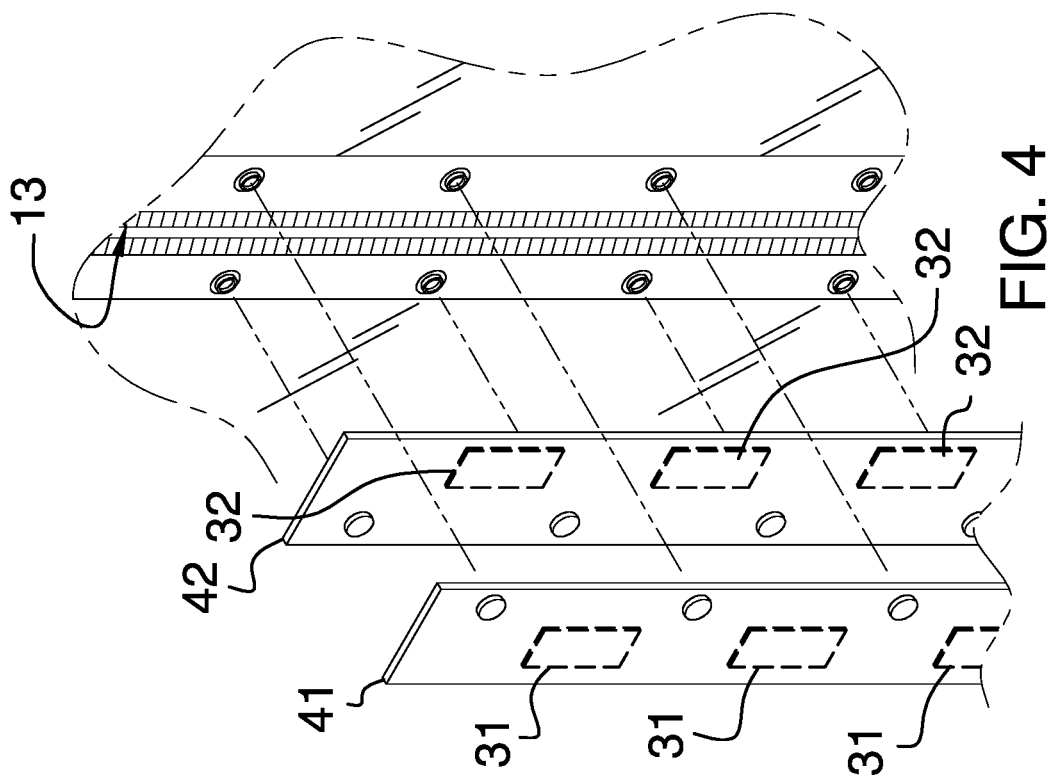

MAGNETIC GOLF CART PANEL CLOSURE DEVICE

PRIORITY STATEMENT

This application takes priority from and is a continuation of pending U.S. patent application Ser. No. 14/180,507 filed on Feb. 14, 2014 under Title 35, U.S.C. Section 120.

BACKGROUND OF THE DISCLOSURE

Field of the Disclosure

The disclosure relates to closure devices and more particularly pertains to a new closure device for facilitating closure of adjacent panels of a golf cart enclosure.

SUMMARY OF THE DISCLOSURE

An embodiment of the disclosure meets the needs presented above by generally comprising a golf cart having a golf cart enclosure thereon. The golf cart has a lateral side that is open and defines an entry into the golf cart. The golf enclosure includes a first panel and a second panel. The first panel extends forward from a rear of the golf cart and over a rear portion of the entry. The second panel extends rearward from a front of the golf cart and over a front portion of the entry. The first and second panels are positioned in a closed position closing the entry or in an open position exposing the entry. A plurality of first magnetic couplers is mounted on the first panel. A plurality of second magnetic couplers is mounted on the second panel. The first magnetic couplers are overlapped with the second magnetic couplers such that the first and second magnetic couplers are releasably engaged with each other. The cart has a bottom edge extending along a bottom of the entry and facing laterally away from the cart. At least one first mating member is attached to the bottom edge and is positioned adjacent to the first panel. At least one first mating member is attached to the bottom edge and is positioned adjacent to the second panel. The first panel has a second mating member attached thereto and is releasably engaged to the first mating member adjacent to the first panel. The second panel has a second mating member attached thereto and is releasably engaged to the first mating member adjacent to the second panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 4 is a front perspective view of an embodiment of the disclosure.

FIG. 5 is a front perspective view of an embodiment of the disclosure.

DESCRIPTION OF THE PREFERRED EMBODIMENT

Figure 1:
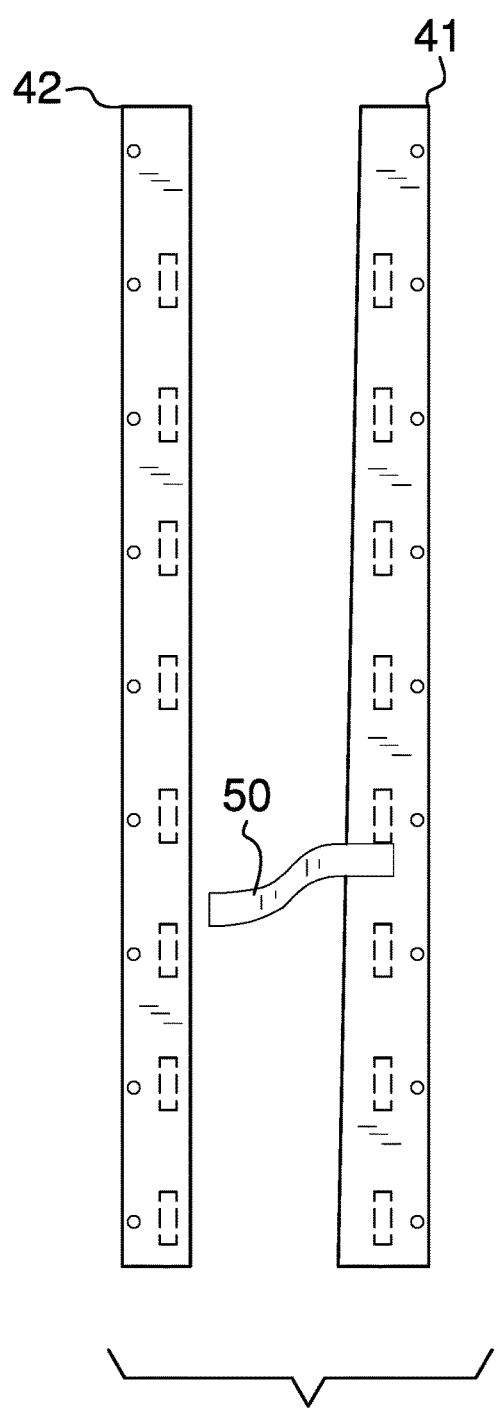
FIG. 1 is a front view of a magnetic golf cart panel closure device according to an embodiment of the disclosure.
Figure 2:
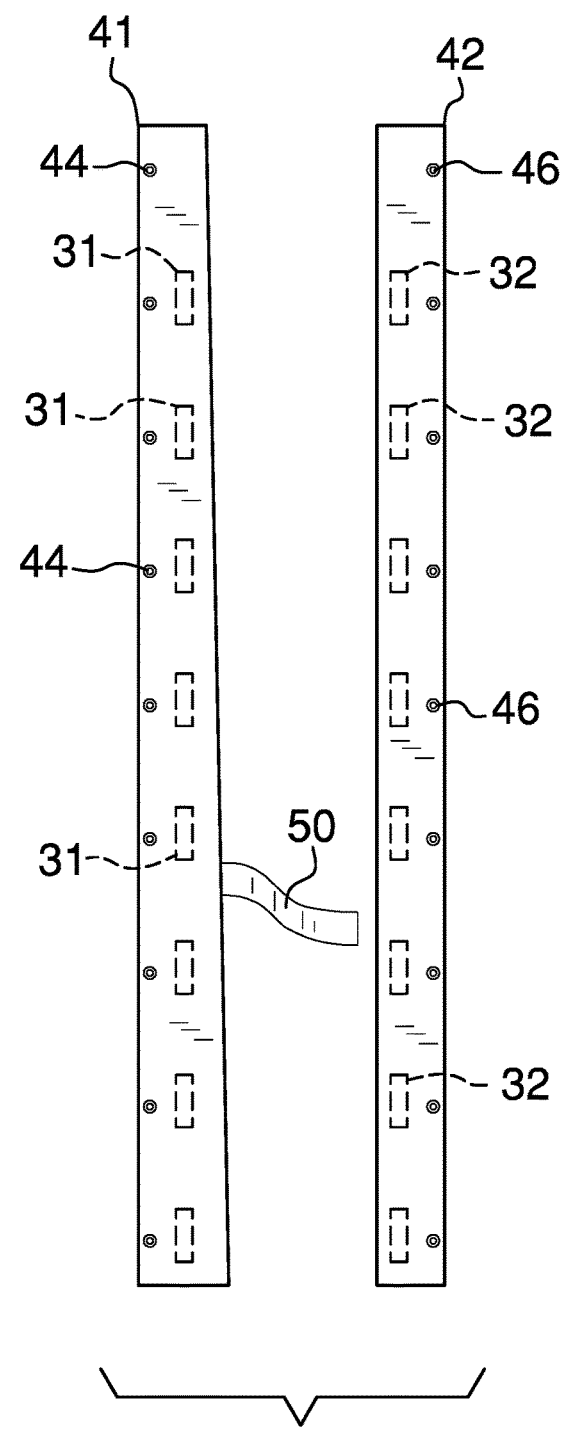
FIG. 2 is a back view of an embodiment of the disclosure.

With reference now to the drawings, and in particular to FIGS. 1 through 7 thereof, a new closure device embodying the principles and concepts of an embodiment of the disclosure and generally designated by the reference numeral 10 will be described.

Figure 3:
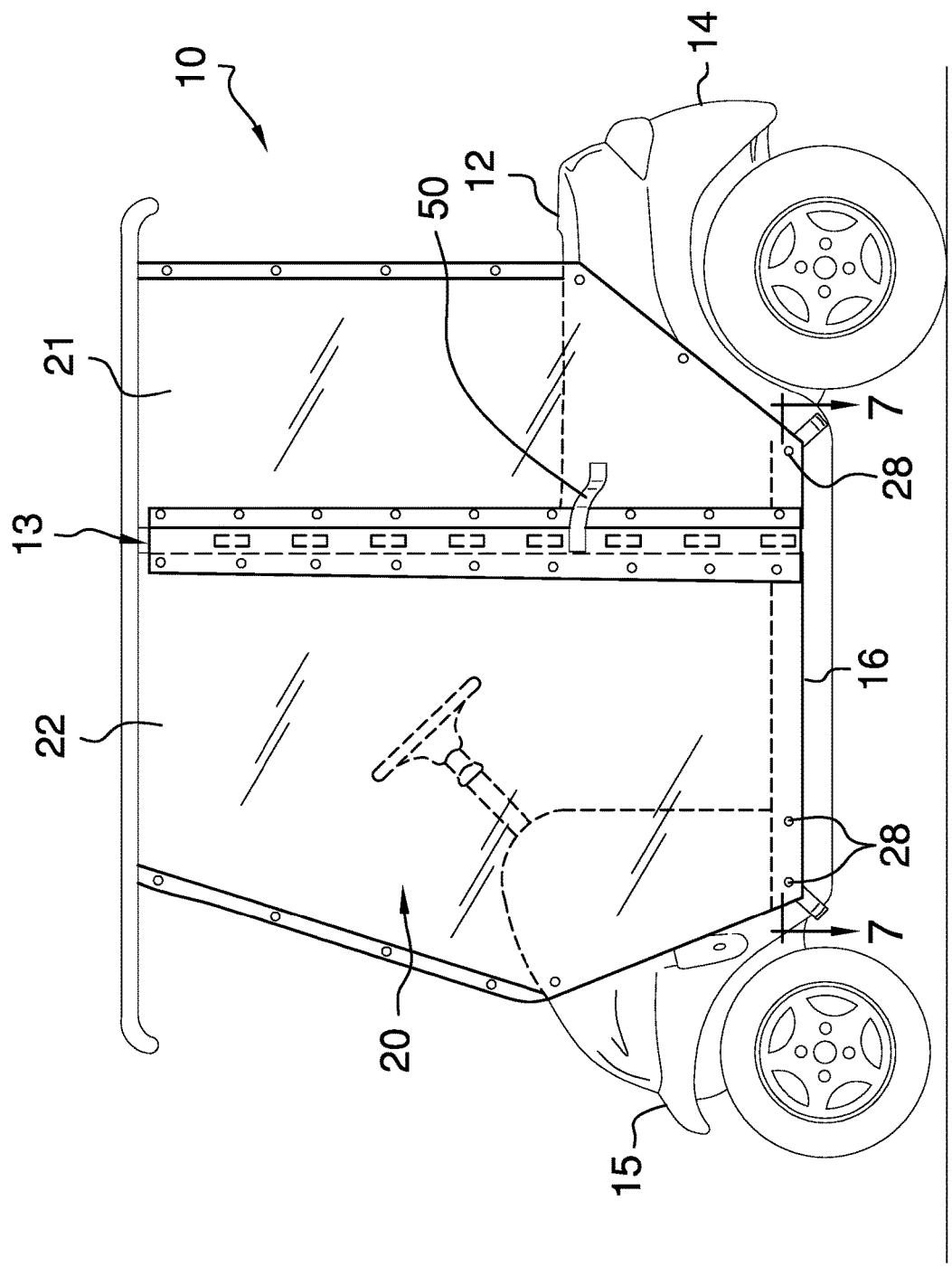
FIG. 3 is a front view of an embodiment of the disclosure in use.
Figure 6:
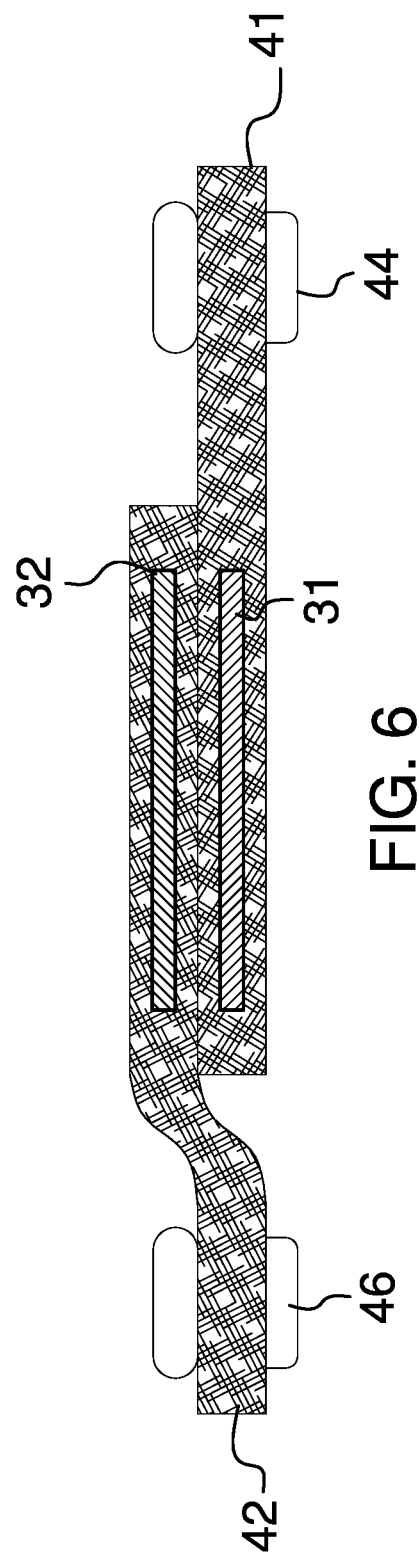
FIG. 6 is a cross-sectional view of an embodiment of the disclosure taken along line 6-6 of FIG. 5.
Figure 7:
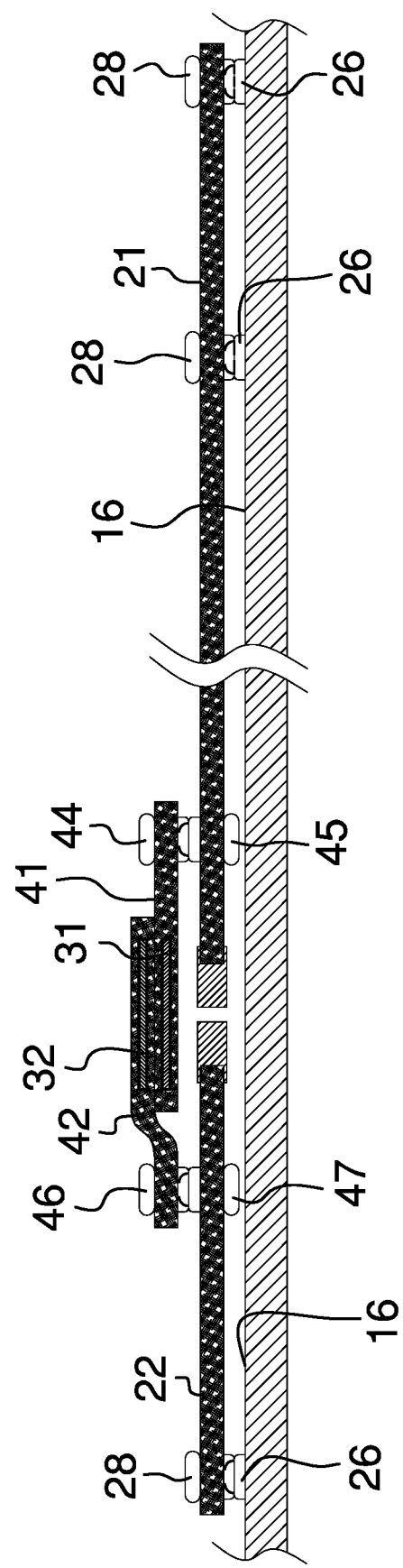
FIG. 7 is a cross-sectional view of an embodiment of the disclosure taken along line 7-7 of FIG. 3.

As best illustrated in FIGS. 1 through 7, the magnetic golf cart panel closure device 10 generally comprises a golf cart 12 that has a golf cart enclosure 20 thereon. The golf cart 12 is conventional and has a lateral side that is open and defines an entry 13 into the golf cart 12. The golf enclosure 20 includes a first panel 21 and a second panel 22 and may conventionally include a zipper 24 for releasably securing the first 21 and second 22 panels together. The first panel 21 extends forward from a rear 14 of the golf cart 12 and over a rear portion of the entry 13. The second panel 22 extends rearward from a front 15 of the golf cart 12 and over a front portion of the entry 13. The first 21 and second 22 panels are positioned in a closed position closing the entry 13, as shown in FIG. 3, or in an open position exposing the entry 13. The cart 12 has a bottom edge 16 extending along a bottom of the entry 13 and facing laterally away from the cart 12. For reasons which will be further explained below, at least one first mating member 26 is attached to the bottom edge 16 and is positioned adjacent to the first panel 21. At least one and maybe at least two first mating members 26 is attached to the bottom edge 16 and positioned adjacent to the second panel 22. The first panel 21 has a second mating member 28 attached thereto that is releasably engaged to the first mating member 26 adjacent to the first panel 21. The second panel 22 will have one, two or more second mating members 28 attached thereto and that is/are releasably engaged to the first mating members 26 adjacent to the second panel 22. The first 26 and second 28 mating members may include snaps as shown in FIG. 7.

A plurality of first magnetic couplers 31 is mounted on the first panel 21 and a plurality of second magnetic couplers 32 is mounted on the second panel 22. The first magnetic couplers 31 are overlapped with the second magnetic couplers 32 such that the first 31 and second 32 magnetic couplers are releasably engaged with each other. The first 31 and second 32 magnetic couplers may be attached permanently to the first 21 and second 22 panels or may be retrofitted to the first 21 and second 22 panels. For example, in a retrofitted embodiment, a first strip 41 has a top end and a bottom end and the first strip 41 is coupled to the first panel 12 adjacent to the second panel 22. The first magnetic couplers 31 are coupled to the first strip 41 and positioned along a length of the first strip 41. A second strip 42 has a top edge and a bottom edge and the second strip 42 is coupled to the second panel 22 adjacent to the first panel 21. The plurality of second magnetic couplers 32 is coupled to the second strip 42 and are positioned along a length of the second strip 42. The first strip 41 extends forwardly of the first panel 21 and the second strip 42 extends rearwardly of the second panel 22 such that the first 41 and second 42 strips overlap and the first 31 and second 32 magnetic couplers are releasably engaged with each other to couple the first panel 21 to the second panel 22. A plurality of first snaps 44 coupled to and extending along the first strip 41 is releasably coupled to an associated complementary existing first panel snaps 45 coupled to the first panel 21 wherein the first strip 41 is coupled to the first panel 21. The first snaps 44 are aligned along a length of the first strip 41. A plurality of second snaps 46 is coupled to and extends along the second strip 42. Each of the second snaps 46 is configured for coupling to an associated complementary existing second panel snap 47 coupled to the second panel 22 wherein the second strip 42 is coupled to the second panel 22. The second snaps 46 are aligned along a length of the second strip 42.

As can be seen in the Figures, the first 31 and second 31 magnetic couplers are magnets each having an elongated shape such that each is elongated along a vertical axis. Additionally, each of the first 31 and second 32 magnetic couplers has a rectangular shape. It has been found that this shape provides for greater attraction between the first 31 and second 32 magnetic couplers which leads to a stronger union between the first 21 and second 22 panels.

A strap 50 is attached to one of the first 21 and second 22 panels to facilitate pulling the second panel 22 from the first panel 21. As shown in FIG. 3, the strap 50 is attached to the second panel 22 and can pulled to urge the second magnetic couplers 32 from the first magnetic couplers 32 and thereby open the entry to the golf cart. Though, the strap 50 in FIGS. 1 and 2 indicate the strap is attached to the first strip 51, it may be preferred to have the strap 50 attached to the second panel 22.

In use, the first 21 and second 22 panels magnetically coupled together to form a seal between rear and front portions of the golf cart enclosure 20. This prevents air from blowing through the golf cart 12 to keep the passengers therein warm and dry. The magnets 31, 32 are mechanically sound compared to a zipper which damages easily after repeated usage. However, the magnets 31, 32 and/or first 41 and second 42 strips may be either retrofitted or removable as indicated above to allow for their replacement since the first 41 and second 42 strips may comprise sleeves holding the magnets and eventual wear on the sleeves may create openings in the sleeves. The first 26 and second 28 mating members attach the first 21 and second 22 panels to the bottom edge 16 of the cart 12. The first 26 and second 28 mating members are spaced from a juncture of the first 21 and second 22 panels and are closer to edges of the first 21 and second 22 panels most adjacent to respective the front 15 or the back 14 of the cart 12. When the first 26 and second 28 mating members are utilized, they prevent air from flowing upwardly between the bottom edge 16 and the first 21 and second panels to prevent the first 31 and second 32 magnetic couplers from detaching from each other. This is a variance from conventional golf cart covers which tend to utilize only a tie down at the corners of the first 21 and second 22 panels but which do not prevent air from blowing upwardly between the bottom edge 16 and the golf enclosure 20. Thus, the first 26 and second 28 mating members prevent the enclosure 20 from opening in high winds.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A magnetic golf cart panel closure system comprising:
   a golf cart having a golf cart enclosure thereon, said golf cart having a lateral side being open and defining an entry into said golf cart, said golf enclosure including a first panel and a second panel, said first panel extending forward from a rear of said golf cart and over a rear portion of said entry, said second panel extending rearward from a front of said golf cart and over a front portion of said entry, said first and second panels being positioned in a closed position closing said entry or in an open position exposing said entry;
   a plurality of first magnetic couplers being mounted on said first panel;
   a plurality of second magnetic couplers being mounted on said second panel;
   said first magnetic couplers being overlapped with said second magnetic couplers such that said first and second magnetic couplers are releasably engaged with each other;
   said cart having a bottom edge extending along a bottom of said entry and facing laterally away from said cart;
   at least one first mating member being attached to said bottom edge and being positioned adjacent to said first panel;
   at least one first mating member being attached to said bottom edge and being positioned adjacent to said second panel;
   said first panel having a second mating member attached thereto and being releasably engaged to said first mating member adjacent to said first panel;
   said second panel having a second mating member attached thereto and being releasably engaged to said first mating member adjacent to said second panel.

2. The magnetic golf cart panel closure system according to claim 1, comprising:
   a first strip having a top end and a bottom end, said first strip being coupled to said first panel of a golf cart enclosure adjacent to said second panel, said firs first magnetic couplers being coupled to said first strip, said first magnetic couplers being positioned along a length of said first strip, said first magnetic couplers each being magnets; and
   a second strip having a top edge and a bottom edge, said second strip being coupled to said second panel of the golf cart enclosure adjacent to said first panel, said plurality of second magnet couplers being coupled to said second strip, said second magnetic couplers being positioned along a length of said second strip.

3. The magnetic golf cart panel closure system according to claim 2, comprising wherein said first and second magnetic couplers are each magnets having an elongated shape being elongated along a vertical axis, each of said second magnetic couplers having a rectangular shape.

4. The magnetic golf cart panel closure system according to claim 2, comprising said first strip extending forwardly of said first panel and said second strip extending rearwardly of said second panel such that said first and second strips overlap and said first and second magnetic couplers are releasably engaged with each other.

5. The magnetic golf cart panel closure system according to claim 1, comprising wherein at least two first mating members are attached to said bottom edge adjacent and being positioned adjacent to said second panel, said second panel having a pair of second mating members attached thereto and being releasably engaged to said first mating members adjacent to said second panel.

6. The magnetic golf cart panel closure system according to claim 2, wherein said first and second strips are removably coupled to an associated one of said first and second panels.

7. The magnetic golf cart panel closure system according to claim 6, further comprising:
  a plurality of first snaps coupled to and extending along said first strip, each of said first snaps being releasably coupled to an associated complementary existing first panel snaps coupled to said first panel wherein said first strip is coupled to said first panel, said first snaps being aligned along a length of said first strip; and
  a plurality of second snaps coupled to and extending along said second strip, each of said second snaps being configured for coupling to an associated complementary existing second panel snap coupled to said second panel wherein said second strip is coupled to said second panel, said second snaps being aligned along a length of said second strip.

8. The magnetic golf cart panel closure system according to claim 1, further comprising a strap being attached to one of said first or second panels to facilitate pulling said second panel from said first panel.

9. A magnetic golf cart panel closure system comprising:
  a golf cart having a golf cart enclosure thereon, said golf cart having a lateral side being open and defining an entry into said golf cart, said golf enclosure including a first panel and a second panel, said first panel extending forward from a rear of said golf cart and over a rear portion of said entry, said second panel extending rearward from a front of said golf cart and over a front portion of said entry, said first and second panels being positioned in a closed position closing said entry or in an open position exposing said entry;
  a first strip having a top end and a bottom end, said first strip being coupled to said first panel of a golf cart enclosure adjacent to second panel;
  a plurality of first magnetic couplers being coupled to said first strip, said first magnetic couplers being positioned along a length of said first strip, said first magnetic couplers each being magnets each having an elongated shape being elongated along a vertical axis, each of said first magnetic couplers having a rectangular shape;
  a second strip having a top edge and a bottom edge, said second strip being coupled to said second panel of the golf cart enclosure adjacent to said first panel;
  a plurality of second magnetic couplers being coupled to said second strip, said second magnetic couplers being positioned along a length of said second strip, said second magnetic couplers being magnetically couplable to said first magnetic couplers wherein said first strip and said second strip are configured to couple the first panel to the second panel, said second magnetic couplers being magnets each having an elongated shape being elongated along a vertical axis, each of said second magnetic couplers having a rectangular shape;
  said first strip extending forwardly of said first panel and said second strip extending rearwardly of said second panel such that said first and second strips overlap and said first and second magnetic couplers are releasably engaged with each other;
  said cart having a bottom edge extending along a bottom of said entry and facing laterally away from said cart;
  at least one first mating member being attached to said bottom edge and being positioned adjacent to said first panel;
  at least two first mating members being attached to said bottom edge and being positioned adjacent to said second panel;
  said first panel having a second mating member attached thereto and being releasably engaged to said first mating member adjacent to said first panel;
  said second panel having a pair of second mating members attached thereto and being releasably engaged to said first mating members adjacent to said second panel;
  a plurality of first snaps coupled to and extending along said first strip, each of said first snaps being releasably coupled to an associated complementary existing first panel snaps coupled to said first panel wherein said first strip is coupled to said first panel, said first snaps being aligned along a length of said first strip;
  a plurality of second snaps coupled to and extending along said second strip, each of said second snaps being configured for coupling to an associated complementary existing second panel snap coupled to said second panel wherein said second strip is coupled to said second panel, said second snaps being aligned along a length of said second strip; and
  a strap is attached to said second panel to facilitate pulling said second panel from said first panel.

* * * * *